United States Patent
Scherer et al.

(10) Patent No.: US 10,295,365 B2
(45) Date of Patent: May 21, 2019

(54) STATE ESTIMATION FOR AERIAL VEHICLES USING MULTI-SENSOR FUSION

(71) Applicant: CARNEGIE MELLON UNIVERSITY, Pittsburgh, PA (US)

(72) Inventors: Sebastian Scherer, Pittsburgh, PA (US); Song Yu, Beijing (CN); Stephen Nuske, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 155 days.

(21) Appl. No.: 15/664,073

(22) Filed: Jul. 31, 2017

(65) Prior Publication Data

US 2018/0031387 A1 Feb. 1, 2018

Related U.S. Application Data

(60) Provisional application No. 62/494,168, filed on Jul. 29, 2016.

(51) Int. Cl.
*G01C 23/00* (2006.01)
*G01C 21/16* (2006.01)
(Continued)

(52) U.S. Cl.
CPC ............ *G01C 23/00* (2013.01); *G01C 5/06* (2013.01); *G01C 21/165* (2013.01); *G01S 19/48* (2013.01); *G01S 19/53* (2013.01); *G06T 7/248* (2017.01); *G06T 7/277* (2017.01); *G06T 7/285* (2017.01); *G06T 7/292* (2017.01); *G06T 7/579* (2017.01); *G06T 7/593* (2017.01); *G06T 7/74* (2017.01); *B64C 39/024* (2013.01); *G01S 19/40* (2013.01);
(Continued)

(58) Field of Classification Search
CPC ........ G01C 23/00; G01C 5/06; G01C 21/165; G06T 7/579; G06T 7/292; G06T 7/74; G06T 7/285; G06T 7/277; G06T 7/248; G06T 7/593; G06T 2207/10021; G06T 2207/10032; G06T 2207/30244; G01S 19/48; G01S 19/53; G01S 19/40; H04N 13/239; H04N 13/282; B64C 39/024
See application file for complete search history.

(56) References Cited

U.S. PATENT DOCUMENTS 8,447,116 B2 * 5/2013 Ma ............................ G01S 5/16
382/195
8,676,498 B2 * 3/2014 Ma ........................ G01C 21/165
345/633

(Continued)

OTHER PUBLICATIONS

Yousif et. al., "An Overview to Visual Odometry and Visual SLAM: Applications to Mobile Robotics", all pages, published Nov. 13, 2015, retrieved Feb. 26, 2019, URL: https://link.springer.com/content/pdf/10.1007%2Fs40903-015-0032-7.pdf (Year: 2015).*

*Primary Examiner* — Calvin Cheung

(57) ABSTRACT

A state estimation system that utilizes long-range stereo visual odometry that can degrade to a monocular system at high-altitude, and integrates GPS, Barometer and IMU measurements. The system has two main parts: An EKF that is loosely fused and a long-range visual odometry part. For visual odometry, the system takes the EKF information for robust camera pose tracking, and the visual odometry outputs will be the measurement for EKF state update.

18 Claims, 11 Drawing Sheets

(51) Int. Cl.
  *G06T 7/73*     (2017.01)
  *G06T 7/246*    (2017.01)
  *G06T 7/285*    (2017.01)
  *G06T 7/292*    (2017.01)
  *G01C 5/06*     (2006.01)
  *G01S 19/53*    (2010.01)
  *G01S 19/48*    (2010.01)
  *G06T 7/579*    (2017.01)
  *G06T 7/593*    (2017.01)
  *G06T 7/277*    (2017.01)
  *G01S 19/40*    (2010.01)
  *B64C 39/02*    (2006.01)
  *H04N 13/282*   (2018.01)
  *H04N 13/239*   (2018.01)

(52) U.S. Cl.
  CPC ............... *G06T 2207/10021* (2013.01); *G06T 2207/10032* (2013.01); *G06T 2207/30244* (2013.01); *H04N 13/239* (2018.05); *H04N 13/282* (2018.05)

(56) References Cited

U.S. PATENT DOCUMENTS

| | | | |
|---|---|---|---|
| 9,037,396 B2 * | 5/2015 | Pack | G01C 21/30 701/409 |
| 9,243,916 B2 * | 1/2016 | Roumeliotis | G01C 21/165 |
| 9,476,730 B2 * | 10/2016 | Samarasekera | G06K 9/00637 |
| 9,488,736 B2 * | 11/2016 | Weisenburger | G01S 19/48 |
| 9,619,561 B2 * | 4/2017 | Chrysanthakopoulos | G06F 16/7837 |
| 10,037,028 B2 * | 7/2018 | Loianno | G08G 5/003 |

* cited by examiner

STATE ESTIMATION FOR AERIAL VEHICLES USING MULTI-SENSOR FUSION

RELATED APPLICATIONS

This application claim the benefit of U.S. Provisional Patent Application No. 62/494,168, filed Jul. 29, 2016.

GOVERNMENT INTEREST

This invention was made with Government support under contract number N00014-14-1-0693 awarded by the Office of Naval Research. The Government has certain rights in this invention.

TECHNICAL FIELD

Embodiments herein generally relate to the field of aerial vehicles, and, more particularly, micro-aerial vehicles using multiple absolute and relative sensors for state estimation.

BACKGROUND OF THE INVENTION

Light weight Micro-Aerial Vehicles (MAVs) equipped with sensors can autonomously access environments that are difficult to access for ground robots. Due to this capability, MAVs have become popular in many robot missions, e.g., structure inspection, environment mapping, reconnaissance and large-scale data gathering. Compared with ground robots, there are two main challenges for MAV autonomous navigation: (1) limited payload, power and onboard computing resources, allowing only light-weight compact sensors (like cameras) to be integrated for MAV applications; and (2) MAVs usually move with fast and aggressive six degrees of freedom (DoF) motions. Accordingly, their state estimation, environment perception and obstacle avoidance are more difficult than ground robots.

For aerial vehicles, and, in particular, for micro-aerial vehicles (MAVs), state estimation is the most critical capability for localization, autonomous obstacle avoidance, robust flight control and 3D environmental mapping. There are three main challenges for a MAV state estimator: (1) it must be able to deal with aggressive 6 degree of freedom (DoF) motion; (2) it should be robust to intermittent global positioning system (GPS) situations, and even to GPS-denied situations; and (3) it should work well both for low- and high-altitude flight.

Robust, accurate and smooth high-rate state estimation is the most critical capability to realize truly autonomous flight of MAVs. The state estimator reports the six DoF MAV position, orientation and the velocity, so the output of the estimator serves as the input for environment mapping, motion planning and trajectory-following control. Global positioning system (GPS) combined with the inertial measurement unit (IMU) state estimation technique has been widely utilized for providing MAV high-rate state information. However, applications of low-rate GPS are limited to open environments. Furthermore, GPS cannot provide accurate positioning information for MAVs, especially in terms of altitude.

As a complimentary sensor for GPS, the IMU measures tri-axis accelerations and rotation rates in the IMU body frame, and the velocity and orientation are calculated as the integral of accelerations and rotation rates over time. For low-cost commercial IMUs, the inertia integral will drift very fast without global rectification information. As a result, the integration of additional sensing is a way to further improve state estimation redundancy, accuracy and robustness.

Because of the low cost, low energy consumption and satisfactory accuracy, camera-based visual odometry (VO) is an ideal choice for providing additional measurements. Stereo visual sensors reconstruct the environment features with the metric scale from the stereo baseline, so stereo-based VO easily generates six DoF pose measurements. The performance of stereo VO highly depends on the ratio between the stereo baseline and environmental depth, namely the baseline-depth ratio. The depth standard deviation from stereo is proportional to the quadratic of depth; thus, stereo VO is limited to short range measurements. At stereo disparities lower than 10 pixels, the depth triangulation from a single stereo rig tends to follow a non-Gaussian curve with a long tail. For cases with a large baseline-depth ratio (e.g., MAV high-altitude flights), the stereo effectively degenerates to a monocular system, thus losing the capability of pose measurements.

SUMMARY OF THE INVENTION

A novel state estimation technique is presented herein that is capable of fusing long-range stereo visual odometry (VO), GPS, barometric and inertial measurement unit (IMU) measurements. The integration is performed by an onboard processor executing software embodying the present invention.

The state estimation system utilizes long-range stereo visual odometry that can degrade to a monocular system at high altitude and integrates GPS, barometric and IMU measurements. The estimation system has two main parts: an EKF estimator that loosely fuses both absolute state measurements (for example, GPS and barometer) and the relative state measurements (for example, IMU and VO). A long-range stereo VO is designed both for low- and high-altitude odometry calculations.

The odometry takes the EKF prediction information for robust camera pose tracking and feature matching, and the stereo VO outputs serve as the relative measurements for the update of the EKF state. There are three main highlights for the system:

(1) The state estimation system utilizes both absolute state measurement sensors (GPS, barometer), the relative six DoF pose state measurement provided by VO. To deal with both absolute and relative state measurements effectively, a new stochastic cloning EKF state estimator to generate accurate and smooth state estimation both for GPS-available and GPS-denied environments is presented.

(2) A robust long-range stereo VO that works well both for low- and high-altitude cases is presented. At low altitude, the VO utilizes stereo images where the features are directly triangulated by stereo pairs with a fixed static stereo baseline. At high altitude, the ratio between the scene depth and stereo baseline becomes large, and the stereo pair effectively degenerates to a monocular system. In this situation, the additional stereo observations over time are fused by both multi-stereo triangulation and a multi-view stereo inverse depth filter for long-range feature depth generation.

(3) The EKF estimator and long-range VO coordinate to improve the robustness of the system. The IMU integral prediction information from the EKF estimator is used both for guiding image-feature matching and long-range VO optimization. Additionally, the VO is utilized as the relative measurement for the update of the EKF state.

DESCRIPTION OF THE DRAWINGS

FIG. 3 shows the relationship between the current pose covariance and the delayed pose covariance in the EKF system covariance matrix.

DETAILED DESCRIPTION

The following description is presented to enable any person skilled in the art to make and use the invention. Various modifications to the disclosed embodiments will be readily apparent to those skilled in the art, and the general principles defined herein may be applied to other embodiments and applications without departing from the scope of the present invention. Thus, the present invention is not intended to be limited to the embodiment shown. Although the invention is described in terms of micro-aerial vehicles, one of skill in the art should realize that the invention is applicable to any aerial vehicle.

In some embodiments of the invention, a technique for state estimation by fusing long-range stereo visual odometry, GPS, barometric and IMU are provided. In one embodiment of the invention, the system is realized utilizing an onboard processor running software implementing the functions of the invention however, it should be realized that any system capable of implementing the functions of the invention could be used. There are two main parts to the system.

Figure 1:
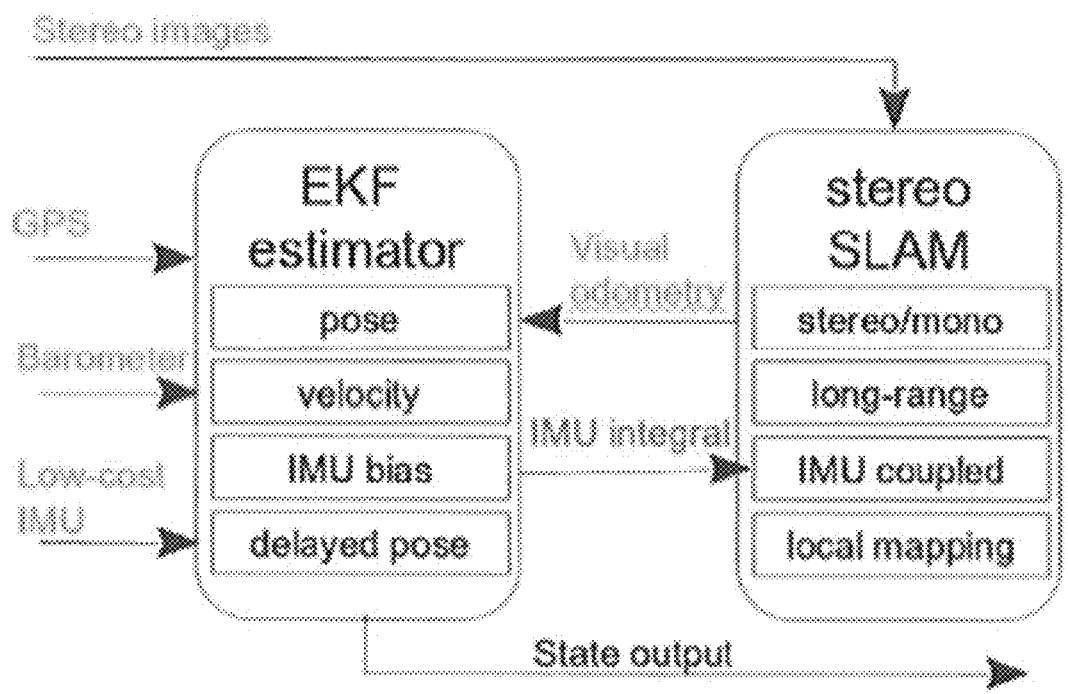
FIG. 1 is a block diagram of the state estimation system.

In a first aspect of the invention, the state estimation system utilizes both absolute state measurement sensors (GPS, barometer), and relative sensors, (IMU and the six DoF pose state measurement provided by VO). A block diagram of the system is shown in FIG. 1. To incorporate both absolute and relative state measurements effectively, a new stochastic cloning EKF state estimator to generate accurate and smooth state estimation both for GPS-available and GPS-denied environments is presented.

In a second aspect of the invention, a robust long-range stereo VO that works well both for low- and high-altitude cases is provided. At low altitude, the VO utilizes stereo images, wherein features are directly triangulated by stereo pairs with a fixed static stereo baseline. At high altitude, the ratio between the scene depth and stereo baseline becomes large, and the stereo pair almost degenerates to a monocular system. In this situation, the additional stereo observations over time are fused by both multi-stereo triangulation and a multi-view stereo inverse depth filter for long-range feature depth generation.

A new stochastic cloning EKF system is presented to fuse both absolute measurements (GPS, and Barometer) and relative measurement (VO and IMU measurement) loosely for GPS-available and GPS-denied environments. To avoid the system state be overwhelmed by VO, a delayed pose and its covariance is kept in the EKF state estimation system, and the measurement Jacobian for VO measurement is derived and analyzed. As shown in FIG. 2(a-b), there are two key features for the system state after a relative VO update and a GPS (or barometer) absolute update, respectively.

Figure 2A:
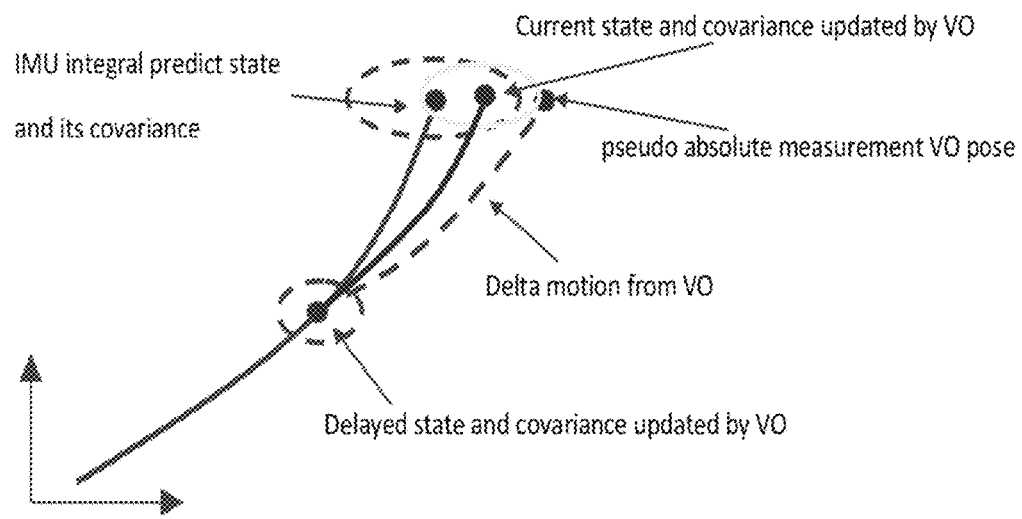
FIG. 2a illustrates EKF state estimation updated by relative measurement.

FIG. 2a shows an EKF state estimation system updated by a relative measurement (e.g., VO relative measurement). After a VO relative measurement update, the updated covariance should have two important properties: (1) it should be lower than the IMU state propagation covariance, since VO information is available to the system; and (2) it must be increased compared with previous error covariance. Otherwise, the absolute measurement (GPS and barometer) will lose the ability to update the state estimation. Compared with pseudo absolute measurement VO update approaches, the covariance using delayed state cloning EKF can meet the two properties.

Figure 2B:
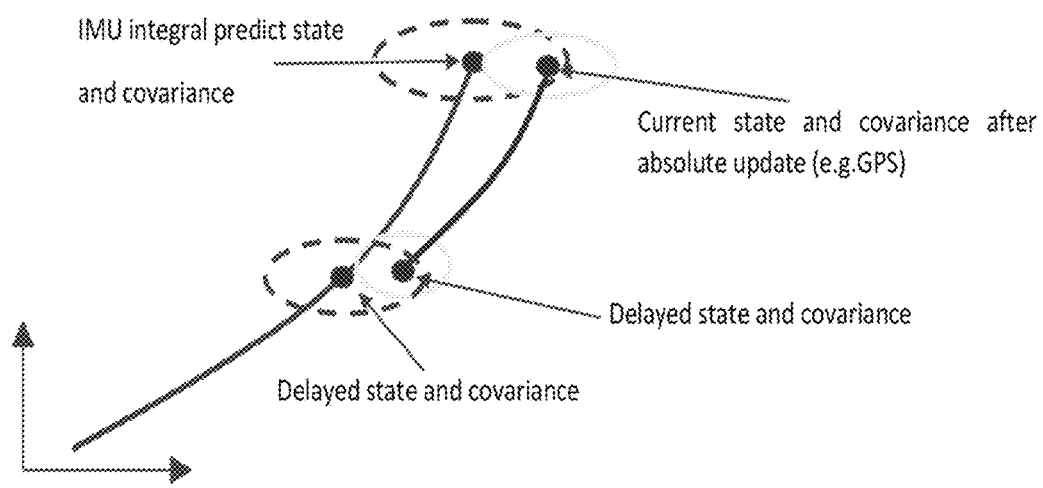
FIG. 2b illustrates EKF state estimation updated by absolute measurement.

FIG. 2b shows an EKF state estimation system updated by absolute measurement (e.g., GPS measurement). After an absolute measurement update of the EKF state by the GPS or barometer, both the current pose covariance and the delayed pose covariance are decreased. Furthermore, the current pose covariance should be higher than the delayed pose covariance. Otherwise, the VO relative measurement will lose the ability to update the EKF state.

For IMU integral state prediction, the new uncertainty from the delayed pose to the current pose is Q. So, Q is expressed as:

$$FP_lF^T+Q=\Pi F_iP_l(\Pi F_i)^T+ \\ \Pi F_iQ_1(\Pi F_i)^T+\Pi F_iQ_2(\Pi F_i)^T+...Q_n$$

Figure 3:
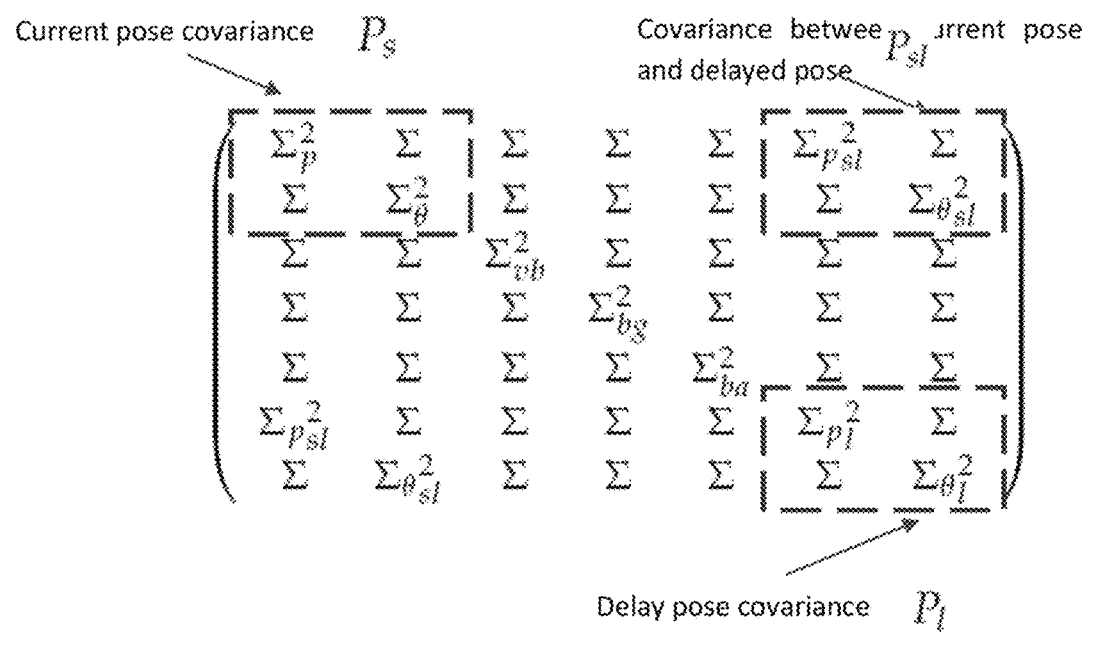

For a relative measurement update, the VO covariance should be balanced with Q. The relationship between current pose covariance and the delayed pose covariance is given in the current state covariance. The new uncertainty Q from system covariance is calculated, as shown in FIG. 3.

The relationship between the current pose covariance and the delayed pose covariance is:

$$FP_lF^T+Q=P_s$$

For covariance $P_{sl}$:

$$FP_l=P_{sl}$$

As a result, the new uncertainty Q is calculated as:

$$Q=P_s-P_{sl}(P_l)^{-1}P_{sl}^T$$

On the basis of Q, the VO covariance is given by balancing the system "weight," that is:

$$R_{vo}=kQ$$

where, k is a positive integer number, it can be initially set as k=1.

The Chi-square test at 0.95 is utilized to verify the compatibility of the VO relative measurement. If the test fails, that means VO covariance should be larger, and the VO covariance as can be smoothed as:

$$R_{vo^*} = 10$$

Figure 4:
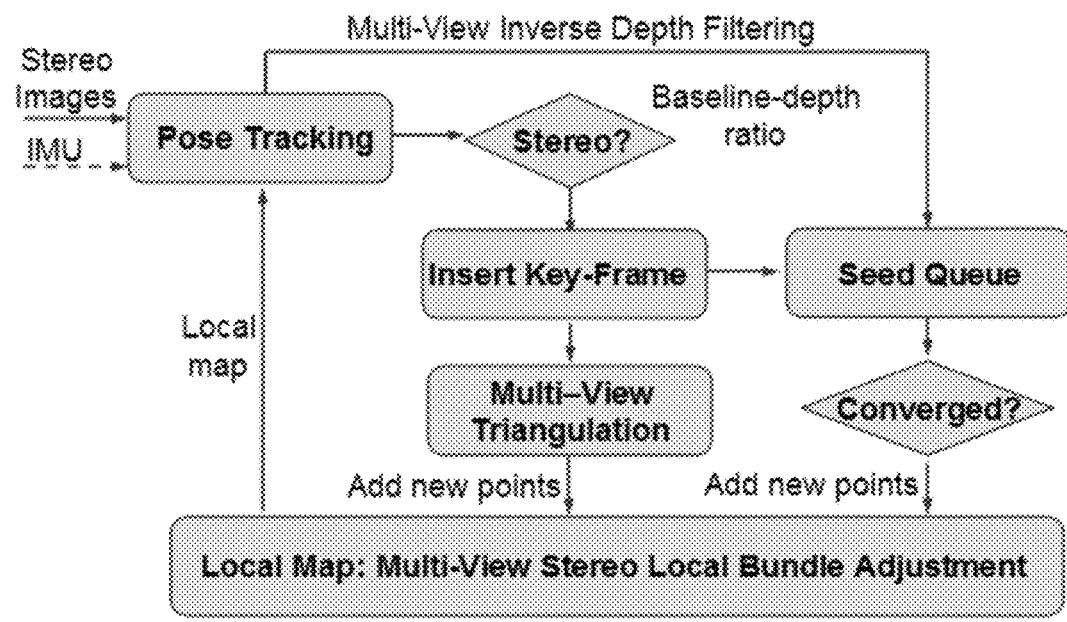
FIG. 4 shows the pipeline of the long-range stereo VO.

Current stereo VO algorithms are limited in short-range. In one embodiment provided herein a stereo VO implementation to make stereo VO robust for MAV long-range high-altitude applications is provided. The pipeline of the long-range stereo VO is shown in FIG. 4. It is a key-frame-based VO technique. The local map consists of a set of 3D sparse map points that is generated by selected key-frames. IMU information is integrated to improve the robustness for aggressive camera motion and repetitive texture environments. Based on the current stereo baseline-depth ratio, the VO system switches both key-frame and new map point generation strategies between stereo and monocular modes.

In short range mode (e.g., MAV low-altitude flight, as shown in FIG. 5*a*), the VO works in a stereo mode. For each new selected key-frame, most of the new features are directly triangulated by a stereo camera pair with a static stereo baseline. Some long-range points are triangulated using both the pseudo-baseline formed by the key-frame's poses and the static stereo baseline. In stereo mode, the environment structure is close to the camera; the image context easily changes, especially for camera rotation. Therefore, the key-frames and its features are inserted into the local map relatively densely.

In long range mode (e.g., high-altitude flight, as shown in FIG. 5*b*), the VO switches to monocular mode, as shown in FIG. 4. The key-frames are inserted sparsely to provide enough relative motion between the key-frames for long-range triangulation. When VO is in a long-range mode, no features will be directly triangulated by static stereo. Because most of the "short-range points" will be outliers due to an incorrect matching from a low or repetitive texture area, such as sky, cloud and trees, the new features will first be triangulated using both a dynamic pseudo baseline and a static stereo baseline (multi-view stereo triangulation). New features that cannot be triangulated by the pseudo baseline are inserted into a "candidate queue". The feature depth will be iteratively refined by subsequently tracking stereo information with a multi-view inverse depth filter. If the inverse depth converges, the candidate feature will be added into the map and then used for camera pose tracking.

Figure 6:
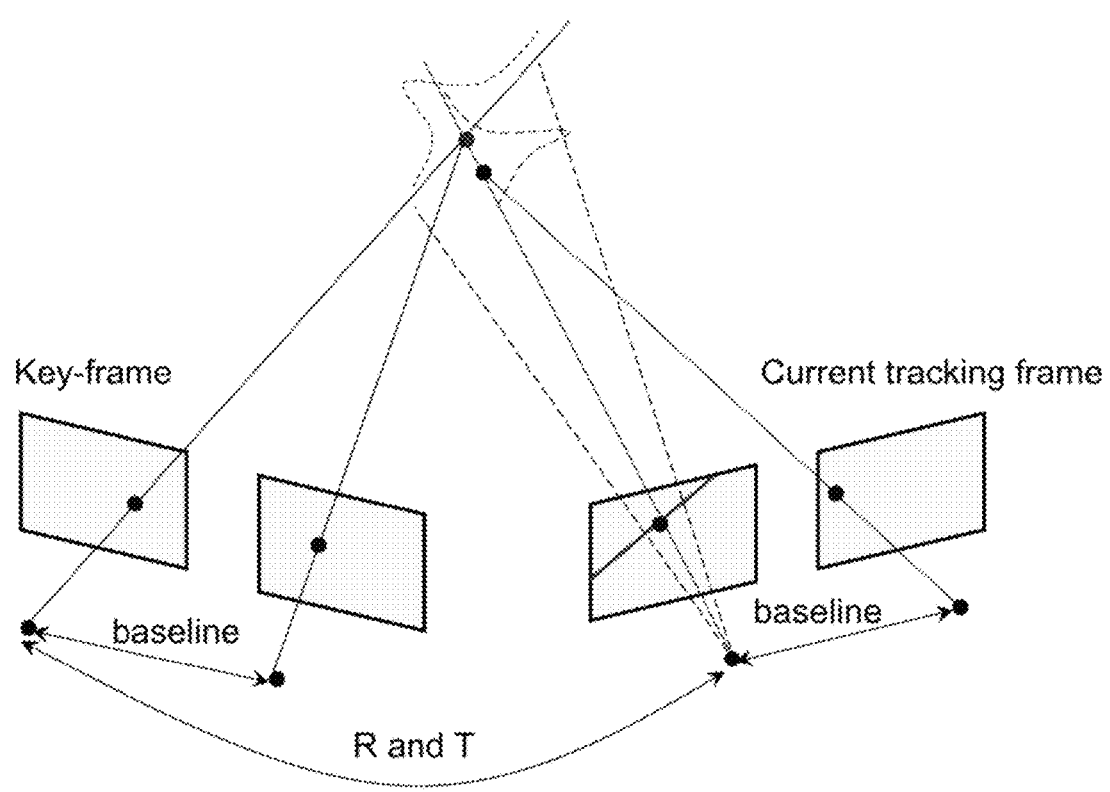
FIG. 6 shows multi-view observations by stereo.

Long-range depth generation by multi-view stereo triangulation: New long-range points without depth will first be triangulated using both the pseudo-baseline and the static stereo baseline from multi-view stereo measurements. The pseudo baseline is formed by the "relative pose" between the neighboring key-frames. As shown in FIG. 6, the current left image feature is searched in the previous key-frame's left image feature set on the basis of an epipolar constraint, and for each key-frame, the matched feature pairs also have their own corresponding features in the right image. As shown in FIG. 6, between the two frames, the camera motions R and T provide a dynamic pseudo baseline, and for each stereo frame, the feature position is constrained by the static stereo baseline.

Figure 7:
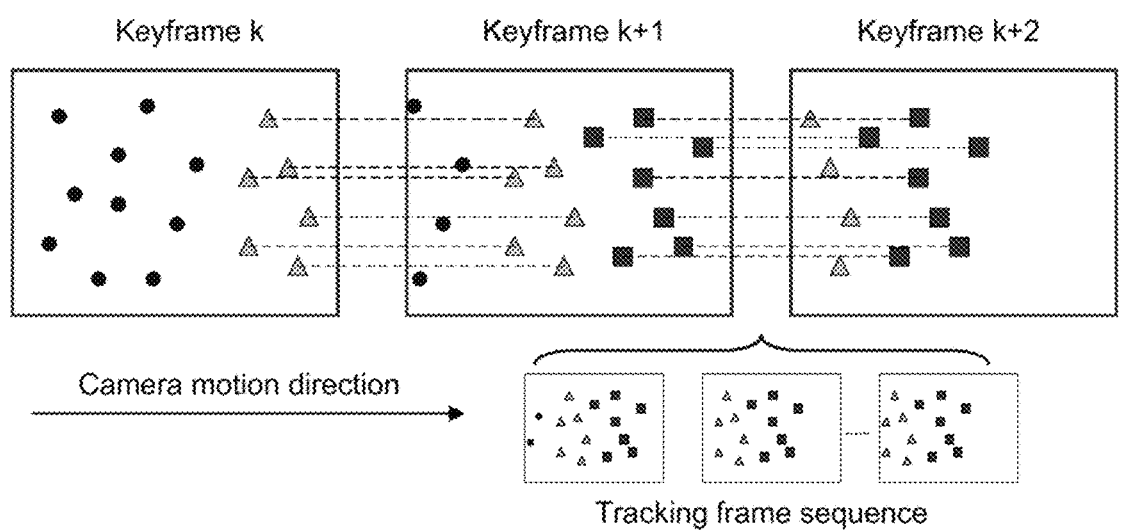
FIG. 7 shows an example of the camera exploration mode.

Long-range depth generation by multi-view stereo inverse depth filtering: The triangulation of the inter-key-frames is a delayed depth generation approach, as only features that can be viewed by at least two key-frames can be triangulated. For the exploration mode (e.g., the stereo moves forward), there are some new features that belong to the current key-frame. Thus, they cannot be triangulated in time. An illustrative example is shown in FIG. 7. To also apply these kinds of new features for subsequent camera pose tracking, an inverse depth filter is used for each new candidate.

FIG. 7 shows an example of the camera exploration mode. For the k-th key-frame; the dots indicate the "old" features that have been matched with the map; the triangles are the new features that await triangulation. For the (k+1)-th key-frame, triangle features can be triangulated, and some new features (red rectangle) wait for the next key-frame for triangulation. Between the (k+1)-th key-frame and the (k+2)-th key-frame, there is a set of tracking frames that also can provide useful measurements for the new features, represented by squares. All multi-view observations for the new feature are integrated using an inverse depth filter.

Long Range Stereo Odometry Pipeline

As previously discussed, stereo depth reconstruction with a fixed static baseline is limited to a short range. For static stereo triangulation, the feature depth z is associated with the stereo matching disparity d. Suppose the stereo matching disparity has variance $\sigma_d^2$; the triangulated depth variance $\sigma_d^2$ by stereo is as Equation (1). It is clear that the stereo depth standard deviation $\sigma_z$ is proportional to a quadratic of depth z. The depth error increases very quickly for the small disparity, long-range stereo measurements and, thus, cannot be utilized for VO optimization.

$$\sigma_z^2 = \left(\frac{\partial z}{\partial d}\right)^2 \sigma_d^2 = \frac{f_x^2 B^2}{d^4} \sigma_d^2 = \frac{z^4}{f_x^2 B^2} \sigma_d^2 \quad (1)$$

Figure 5:
FIG. 5a shows a short-range environment. In this situation, most of the features are directly triangulated by static stereo baseline.
FIG. 5b shows a long-range environment in which large disparities of "short-range" features can be detected due to incorrect matching for the repetitive texture area. For this case, most of the "short-range" features are outliers; thus, they cannot be directly triangulated by static stereo baseline.
Figure 5:

Long-range stereo depth error (bias) can be effectively reduced by introducing additional stereo observation over time, namely multi-view stereo with a dynamic pseudo baseline. The pseudo baseline between the stereo frames can be used for the triangulation of the long-range stereo points. The fixed stereo baseline can provide an absolute scale constraint. Based on this idea, a sparse feature-based stereo VO both for short- and long-range cases was developed. The pipeline of the proposed long-range stereo VO is shown in FIG. 4. It is a key-frame-based VO technique. The local map consists of a set of 3D sparse map points that is generated by selected key-frames. Furthermore, IMU information is integrated to further improve the robustness for aggressive camera motion and repetitive texture environments. Based on the current stereo baseline-depth ratio, the VO system switches both key-frame and new map point generation strategies between stereo and monocular modes:

For a short range (e.g., MAV low-altitude flight, as shown in FIG. 5(*a*), the VO works with a stereo mode. For each new selected key-frame, most of the new features are directly triangulated by the stereo camera pair with the static stereo baseline. For some long-range points, they are triangulated using both the pseudo-baseline formed by the key-frame's poses and the static stereo baseline. In stereo mode, the environment structure is close to the camera; the image context easily changes especially for camera rotation. Therefore, the key-frames and its features are inserted into the local map relatively densely.

For a long range (e.g., high-altitude flight, as shown in FIG. 5(*b*), the VO switches to monocular mode. The key-frames are inserted sparsely to provide enough relative motion between the key-frames for long-range triangulation. When VO is in a long-range mode, no features will be directly triangulated by static stereo. Because most of the "short-range points" will be outliers due to an incorrect matching from a low or repetitive texture area, such as sky, cloud and trees, instead, the new will first be triangulated using both a dynamic pseudo baseline and a static stereo baseline. The new features that cannot be triangulated by the pseudo baseline are inserted into a "candidate queue". The feature depth will be iteratively refined by subsequently tracking stereo information with a multi-view inverse depth filter. If the inverse depth converges, the candidate feature will be added into the map and then used for camera pose tracking.

Long-Range Point Generation Using Multi-View Stereo Triangulation

The most critical aspect for long-range stereo is feature depth generation. For each new key-frame, its features can be classified into three groups: (1) the features have been matched with the map. (2) new features with an effective stereo depth (i.e, short-range points, with enough stereo disparity). (3) new features with small disparities (long-range points).

The new long-range points without depth will first be triangulated using both the pseudo-baseline and the static stereo baseline from multi-view stereo measurements. The pseudo baseline is formed by the "relative pose" between the neighboring key-frames. As shown in FIG. 6, the current left image feature is searched in the previous key-frame's left image feature set on the basis of an epipolar constraint, and for each key-frame, the matched feature pairs also have their own corresponding features in the right image. To make the matching more robust, the epipolar constraint between right image features is also checked. As a result, for each new map point, four matched features can be obtained between two key-frames, and the map point is triangulated as the intersection point of the four rays in the sense of least-squares.

Long-Range Point Generation by Multi-View Stereo Inverse Depth Filtering

The inter-key-frames' triangulation is a kind of delayed depth generation approach because only features that can be viewed by at least two key-frames can be triangulated. For the exploration mode (e.g., the stereo moves forward), there are some new features that belong to the current key-frame itself; thus, they cannot be triangulated in time. An illustrative example is shown in FIG. 7. To also apply these kinds of new features for subsequent camera pose tracking, an inverse depth filter for each new candidate was designed. For stereo, the inverse depth $$\rho = \frac{1}{z} = \frac{d}{f_x B}$$

is proportional to disparity d; as a result, the inverse depth uncertainty is easily modeled by a Gaussian distribution:

$$\sigma_\rho^2 = \frac{1}{f_x^2 B^2} \sigma_d^2 \quad (2)$$

For each long-range candidate feature that belongs to the new inserted key-frame, its initial inverse depth prior is directly obtained from noisy static stereo depth triangulation, denoted as $$\mathcal{N}\left(\rho_0 \frac{1}{f_x^2 B^2} \sigma_d^2\right)$$

During the subsequent pose tracking, each new tracking frame is utilized to filter the initial distribution $$\mathcal{N}\left(\rho_0 \frac{1}{f_x^2 B^2} \sigma_d^2\right),$$

and the new feature candidate will be added to the map until its inverse depth variance is smaller than a given threshold. Ideally, for each new tracking frame, two new observations can be obtained for the candidate feature: (1) the inverse depth observation distribution for the candidate is calculated from the tracking frame static stereo matching; and (2) the inverse depth observation distribution can also be obtained by the dynamic pseudo baseline formed by the motion between the current tracking frame and its reference key-frame. Therefore, the filtered inverse depth distribution can be updated by the two new observations.

Denote as the 3D coordinate of a candidate feature with $z_0=1$ as $P_0=(x_0, y_0, 1)^T$ in the key-frame coordinate and its corresponding matching point in the current tracking frame with $z_1=1$ as $P_1=(x_1, y_1, 1)^T$. The motion from the key-frame to the current tracking frame is $R_{10}$, $t_{10}=(t_x, t_y, t_z)^T$, so the relationship of the two points is:

$$\frac{1}{\rho_1} P_1 = \frac{1}{\rho_0} R_{10} P_0 + t_{10} \quad (3)$$

where $\rho_0$ and $\rho_1$ represent the inverse depth measurements in the current tracking frame and key-frame, respectively.

For the current tracking frame, we observe the inverse depth stereo $\rho_1$ with its variance. Therefore, the new measured inverse depth and its variance in the key-frame coordinate are calculated by projecting the new measurement $$\mathcal{N}\left(\rho_1 \frac{1}{f_x^2 B^2} \sigma_d^2\right)$$

to the key-frame coordinate based on the last row of Equation (3):

$$\rho_0^s = \frac{\frac{1}{\rho_1} - t_z}{|R_{10}(3)P_0|} \quad (4)$$

$$\sigma_{\rho_0^s}^2 = \left(\frac{\rho_0^s}{\rho_1}\right)^4 \left(\frac{1}{R_{10}(3)P_0 f_x B}\right)^2 \sigma_d^2$$

where $R_{10}$ (3) represents the third row of rotation matrix $R_{10}$ and $\sigma_d^2$ is the new stereo disparity variance in the current tracking frame (set $\sigma_d^2=1$).

The inverse depth triangulation distribution using the motion from the key-frame to the current tracking frame is also derived from Equation (3) (with the first row and the last row):

$$\rho_0^g = \frac{R_{10}(1)P_0 - R_{10}(3)P_0 x_1}{t_z x_1 - t_x} \quad (5)$$

$$\sigma_{\rho_0^g}^2 = \left(\frac{R_{10}(3)P_0 t_x - R_{10}(1)P_0 t_z}{(t_z x_1 - t_x)^2 f_x}\right)^2 \sigma_{u1}^2$$

where $R_{10}$ (1) represents the first row of rotation matrix $R_{10}$ and $\sigma_{u1}^2$ describes the matching error variance along the epipolar line in the current tracking frame; for experimental purposes set $\sigma_{u1}^2=4$. To remove the outlier inverse depth measurements, the two new inverse depth hypotheses are further tested with prior $\mathcal{N}(\rho_0, \sigma_{\rho_0}^2)$ using $X^2$ compatibility testing at 0.95. After passing the test, the posterior of the inverse depth distribution for the candidate feature is updated by multiplying the prior with the new measurements $\mathcal{N}(\rho_0^2, \sigma_{\rho_0}^2)$ and $\mathcal{N}(\rho_0^e, \sigma_{\rho_0^e}^2)$, that is:

$$\mathcal{N}_{(\rho_0^+, \sigma_{\rho_0^+}^2)} = \mathcal{N}_{(\rho_0, \sigma_{\rho_0}^2)} \cdot \mathcal{N}_{(\rho_0^s, \sigma_{\rho_0^s}^2)} \cdot \mathcal{N}_{(\rho_0^e, \sigma_{\rho_0^e}^2)} \tag{6}$$

Local Bundle Adjustment for Multi-View Stereo Optimization

Figure 8:
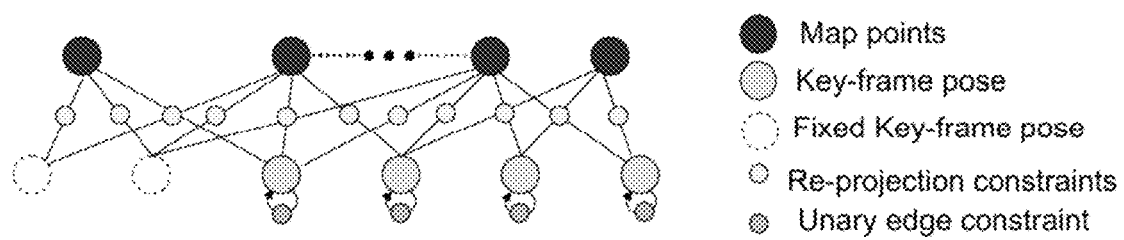
FIG. 8 shows a factor graph for long-range stereo local bundle adjustments.

The long-range stereo points generated by either triangulation or inverse depth filtering may still be noisy. An effective approach to further improve the feature 3D reconstruction accuracy is multi-view stereo local Bundle Adjustment (BA). During the local BA, the re-projection errors for both left and right images are considered. If the map points are reconstructed with an incorrect scale, the re-projection error on the right images will be large. Accordingly, the "weak" static stereo baseline can provide an absolute scale constraint for local BA optimization. The Jacobian $J_{pi}$ of the rejection residual $\varepsilon_{reproj}(i)$ w.r.t. the map point $P_i=(X_i, Y_i, Z_i)^T$ is:

$$J_{p_i} = \begin{bmatrix} \frac{\partial \varepsilon_{reproj}(i)}{\partial u_i^l} \frac{\partial u_i^l}{\partial P_i} \\ \frac{\partial \varepsilon_{reproj}(i)}{\partial v_i^l} \frac{\partial v_i^l}{\partial P_i} \\ \frac{\partial \varepsilon_{reproj}(i)}{\partial u_i^r} \frac{\partial u_i^r}{\partial P_i} \end{bmatrix} = -\frac{1}{Z_c} \begin{bmatrix} f_x & 0 & -f_x \frac{X_c}{Z_c} \\ 0 & f_y & -f_y \frac{Y_c}{Z_c} \\ f_x & 0 & -f_x \frac{X_c - B}{Z_c} \end{bmatrix} R \tag{7}$$

where $P_c=(X_c, Y_c, Z_c)^T$ is the map point 3D coordinate in the left camera frame system. The first two rows are the residual Jacobian w.r.t. the left image and the last row is for right image. R is the camera rotation matrix. The factor graph for the long-range stereo is shown in FIG. 8, and a unary edge $I_{4\times4}$ is added to each key-frame pose vertex. Consequently, the local BA will mainly focus on the map point optimization, and the key-frame's pose can only be changed in a small range. The factor graph is more like a structure-only bundle adjustment since the camera pose tracking has been fused with the IMU motion information).

IMU Tightly-Coupled Odometry Calculation

Figure 9:
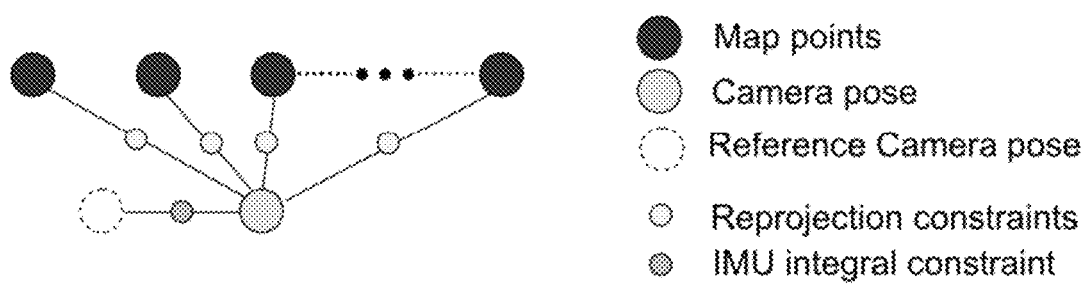
FIG. 9 shows the factor graph for stereo IMU tightly-coupled odometry.

The integration of an IMU motion prior to stereo VO has two advantages: (1) it provides a good initial motion guess for feature guided matching; (2) it gives a motion prior constraint for odometry optimization. A tightly-coupled stereo VO was designed by adding an IMU integral constraint into the 3D-2D re-projection cost non-linear optimization framework. FIG. 9 shows the factor graph for the stereo VO; the camera pose tracking w.r.t. the local map can also be seen as a motion-only bundle adjustment. In this graph, map points and reference frame pose are fixed; only the current pose is set free for optimization. The cost function is:

$$(R, t) = \operatorname{argmin}\left( w \left( \sum_{i=1}^{N} \|l_i - \pi^l(P_i; R, t)\|^2 + \|r_i - \pi^r(P_i; R, t)\|^2 \right) + (1-w)\|(I_{imu} - (R, t)^T)\|^2 \right) \tag{8}$$

where the current camera pose (R, t) is calculated by minimizing a non-linear re-projection error cost function. The 3D point in the local map is $P_c=(X_i, Y_i, Z_i)$; its matched 2D features in the current stereo rig are $l_i=(u_i^l, v_i^l)$ and $r_i=(u_i^r, v_i^r)$ for left and right images; $\pi^l$ and $\pi^r$ are the 3D-2D re-projection model for left and right cameras, respectively. N indicates the number of matched features. $I_{imu}$ denotes the IMU motion integral between the current stereo frame and the reference stereo frame. The term $\|I_{imu}-(R, t)^T\|^2$ represents the IMU integral residual. $\omega \subset [0,1]$ is the weight for the IMU integral constraint.

The optimal solution for the camera pose tracking is obtained by Levenberg-Marquardt iteration:

$$(J_x^T J_x + \lambda I)\Delta X = -J_x \epsilon_x \tag{9}$$

where $J_x$ and $\varepsilon_x$ are the Jacobian and residual at current pose x for the stereo pose tracking system. It has the form:

$$J_x = \begin{bmatrix} w(J_{reproj}) \\ (1-w)(I_{6\times6}) \end{bmatrix} \tag{10}$$

$$\varepsilon_x = \begin{bmatrix} w(\varepsilon_{reproj}) \\ (1-w)(\varepsilon_{imu}) \end{bmatrix} \tag{11}$$

where $I_{6\times6}$ is a 6×6 unit matrix. $J_{reproj}$ is the Jacobian for feature re-projection error. $\varepsilon_{reproj}$ is feature re-projection error. $\varepsilon_{imu}$ indicates the IMU integral residual. For each map point $P_i=(X_i, Y_i, Z_i)^T$, its 3D-2D reprojection error $\varepsilon_{reproj}(i)$ is calculated as:

$$\varepsilon_{reproj}(i) = m_i - \pi(P_i; R, t) = m_i - \frac{1}{Z_c}\begin{bmatrix} f_x & 0 & u_0 \\ 0 & f_y & v_0 \end{bmatrix}\left[R\begin{pmatrix} X_i \\ Y_i \\ Z_i \end{pmatrix} + t - \begin{pmatrix} B \\ 0 \\ 0 \end{pmatrix}\right] \tag{12}$$

Where $m_i \in l_i, r_i$ indicates the measured feature coordinate for the left or the right images. $Z_c$ is the feature depth by transforming the map point to the left camera coordinate frame. B=0 for the left camera, and B=−baseline for right camera. $f_x, f_y, u_0, v_0$ are the stereo intrinsic parameters. For the optimization, the minimal parametrization for the camera pose R, t in Lie manifold SE(3) denoted as: $X=(\theta_x, \theta_y, \theta_z, t_x, t_y, t_z)^T$ was used. The Jacobian $J_{reproj}(i)$ for the 3D-2D re-projection error $\varepsilon_{reproj}(i)$ w.r.t. the camera pose X is:

$$J_{reproj}(i) = \begin{bmatrix} \frac{\partial \varepsilon_{reproj}(i)}{\partial u_i^l} \frac{\partial u_i^l}{\partial X} \\ \frac{\partial \varepsilon_{reproj}(i)}{\partial v_i^l} \frac{\partial v_i^l}{\partial X} \\ \frac{\partial \varepsilon_{reproj}(i)}{\partial u_i^r} \frac{\partial u_i^r}{\partial X} \end{bmatrix} \tag{13}$$

-continued $$= \begin{bmatrix} f_x \frac{X_c Y_c}{Z_c^2} & -f_x \frac{X_c^2 + Z_c^2}{Z_c^2} & -f_x \frac{Y_c}{Z_c} & -f_x \frac{1}{Z_c} & 0 & f_x \frac{X_c}{Z_c^2} \\ f_y \frac{Y_c^2 + Z_c^2}{Z_c^2} & -f_y \frac{X_c Y_c}{Z_c^2} & -f_y \frac{X_c}{Z_c} & 0 & -f_y \frac{1}{Z_c} & f_y \frac{Y_c}{Z_c^2} \\ f_x \frac{X_c Y_c}{Z_c^2} - B \frac{Y_c}{Z_c^2} & -f_x \frac{X_c^2 + Z_c^2}{Z_c^2} + B \frac{X_c}{Z_c^2} & -f_x \frac{Y_c}{Z_c} & -f_x \frac{1}{Z_c} & 0 & f_x \frac{X_c}{Z_c^2} - B \frac{1}{Z_c^2} \end{bmatrix}$$

where $P_c = (X_c, Y_c, Z_c)^T$ is the map point 3D coordinate in the left camera frame, i.e., $P_c = RP_t + t$. The first two rows are the residual Jacobian w.r.t. the left image, and the last row is for right image.

As a result, for N stereo features, the final system Jacobian $J_x$ has 3N+6 rows. Additionally, based on the incremental solution $\Delta X = (\Delta\theta, \Delta t)$ from Equation (9), the update of the current camera pose is expressed as:

$$R = \exp([\Delta\theta]_x) R$$

$$t = \exp([\Delta\theta]_x) t + \Delta t \tag{14}$$

where $[\Delta\theta]_x$ is the skew-symmetric matrix of the incremental rotation vector $\Delta\theta$ and $\exp([\Delta\theta]_x)$ is an exponential map.

Robust Multi-Sensor Fusion Base on a Stochastic Cloning EKF

Figure 10:
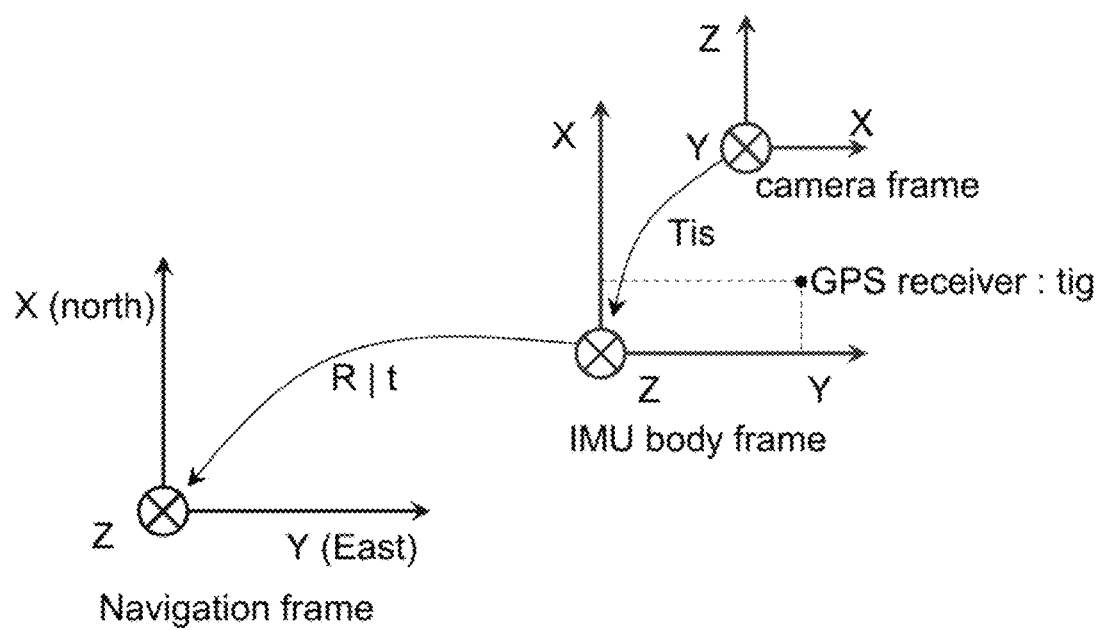
FIG. 10 shows the definition of coordinate frames for EKF and state estimation.

An EKF state estimator for the multi-sensor loosely-coupled state estimation is provided. In the EKF, IMU measurements are utilized to propagate the system state and covariance. For the update of the EKF state, both absolute measurements (GPS and barometer) and relative state measurements (stereo VO) are fused. The coordinate systems for the EKF estimator are shown in FIG. 10. The navigation frame is a local NED (North-East-Down) frame, and the initial position is determined by the first GPS measurement. The EKF estimates the IMU body frame pose w.r.t. the navigation frame. The transformation from the camera frame to the IMU body frame is denoted as $T_{is}$, and the GPS receiver coordinate in the IMU body frame is $t_{ig}$.

IMU Integration

The IMU sensor measures the tri-axis accelerations and tri-axis angular rates w.r.t. the IMU body frame. The measurements given by the IMU are corrupted by Gaussian noise and a slowly varying bias terms, which must be removed before state estimation processing. Furthermore, the IMU accelerometers measure the force, which must be compensated by gravity. The following continuous-time model expresses the relationship between the IMU measured signals and true ones:

$$\omega_m = \omega + b_g + n_g$$

$$a_m = a + R^T g + b_a + n_a \tag{15}$$

where $\omega_m \in \mathbb{R}^3$ and $a_m \in \mathbb{R}^3$ are the measured acceleration and angular rate, respectively. $\omega_m \in \mathbb{R}^3$ and $a_m \in \mathbb{R}^3$ indicate the true signals. $n_g$ and $n_a$ are zero-mean Gaussian $\mathcal{N}(0, \theta_g^2)$ and $\mathcal{N}(0, \theta_a^2)$; $b_g \in \mathbb{R}^3$ and $b_a \in \mathbb{R}^3$ are slowly varying bias terms for the accelerometer and gyroscope, respectively.

Additionally, $g \in \mathbb{R}^3$ is gravity acceleration; the rotation matrix $R \in SO(3)$ indicates the current IMU pose w.r.t. the navigation frame. The estimated angular rate and acceleration rate are denoted as $\hat{\omega} \in \mathbb{R}^3$, $\hat{u} \in \mathbb{R}^3$ respectively. Additionally, the estimated bias terms for angular rate and acceleration are $\hat{b}_g$ and $\hat{b}_a$:

$$\hat{\omega} = \omega_m - \hat{b}_g, \hat{a} = a_m - \hat{b}_a \tag{16}$$

Denote $\delta b_g = b_g - \hat{b}_g$, $\delta b_a = b_a - \hat{b}_a$ as the bias errors between the true bias $b_g$, $b_a$ and the estimated bias $\hat{b}_g$, $\hat{b}_a$ and the slowly varying motion for bias errors are modeled as:

$$\delta b_g = r_g, \delta b_a = r_a \tag{17}$$

where $r_g \sim \mathcal{N}(0, \sigma_{rg}^2)$ and $r_a \sim \mathcal{N}(0, \sigma_{ra}^2)$ are zero-mean Gaussian.

EKF State Definition and Jacobians

Based on the above IMU kinematic model, the discrete IMU integral equations are:

$$p(k+1) = p(k) + v(k)dt + \frac{1}{2}\hat{a}dt^2 \tag{18}$$

$$v_b(k+1) = v_b(k) + (\hat{a} - [\hat{\omega}]_x v_b(k))dt$$

$$R(k+1) = R(k)\exp([\hat{\omega}dt]_x)$$

where $p(k) \in \mathbb{R}^3$ indicates the three DoF position w.r.t. the navigation frame at instant k. $v_b(k)$ is the velocity defined in the IMU body frame, and $r(k) \in SO(3)$ is the rotation matrix w.r.t. the navigation frame. $[\hat{\omega}dt]_x$ is a skew-symmetric matrix of the angular rate integral rotation vector $\hat{\omega}dt$; $\exp([\hat{\omega}dt]_x)$ is an exponential map in the Lie manifold $SO(3)$. dt is the IMU sampling time. Based on the IMU integral equations and bias error model, the EKF system state S is defined as:

$$S = (p, \delta\theta, v_b, \delta b_g, \delta b_a)^T \in \mathbb{R}^{15} \tag{19}$$

where $p \in \mathbb{R}^3$ indicates position w.r.t. the navigation frame, $\delta\theta \in \mathbb{R}^3$ is the error rotation vector w.r.t. the IMU body frame, $v_b \in \mathbb{R}^3$ is the velocity w.r.t. the IMU body frame and $\delta b_g \in \mathbb{R}^3$, $\delta b_a \in \mathbb{R}^3$ are the current bias error terms. The estimated rotation matrix is defined as $\hat{R} \in SO(3)$, so the true rotation matrix $R \in SO(3)$ after the rotation error compensation is calculated by matrix right multiplication:

$$R = \hat{R}\exp([\delta\theta]_x) \tag{20}$$

where $[\delta\theta]_x$ is skew-symmetric matrix of error rotation vector $\delta\theta$.

Based on the above system state definition, the system state dynamics $\dot{S}$ is derived as:

$$\dot{p} = \hat{R}\exp([\delta\theta]_x)v_b$$

$$\dot{\delta\theta} = \exp([\delta\theta]_x)(\hat{\omega} - \delta b_g - n_g)$$

$$\dot{v}_b = -[\hat{\omega} - \delta b_g - n_g]_x v_b + (\hat{R}\exp([\delta\theta]_x))^T g + \hat{a} - \delta b_a - n_a$$

$$\dot{\delta b}_g = r_g$$

$$\dot{\delta b}_a = r_a \tag{21}$$

Therefore, the Jacobian matrix $$\frac{d\dot{S}}{dS} \in \mathbb{R}^{15 \times 15}$$

for the system dynamics is obtained as:

$$\frac{\partial \dot{S}}{\partial S} = \begin{pmatrix} 0_{3\times3} & -\hat{R}[v_b]_\times & \hat{R}\exp([\delta\theta]_\times) & 0_{3\times3} & 0_{3\times3} \\ 0_{3\times3} & -[\hat{\omega}-\delta b_g - n_g]_\times & 0_{3\times3} & -\exp([\delta\theta]_\times) & 0_{3\times3} \\ 0_{3\times3} & [\hat{R}^T g]_\times & -[\omega-\delta b_g - n_b]_\times & -[v_b]_\times & -I_{3\times3} \\ 0_{3\times3} & 0_{3\times3} & 0_{3\times3} & 0_{3\times3} & 0_{3\times3} \\ 0_{3\times3} & 0_{3\times3} & 0_{3\times3} & 0_{3\times3} & 0_{3\times3} \end{pmatrix} \quad (22)$$

where $I_{3\times3}$ denotes the 3×3 identity matrix and $0_{3\times3}$ denotes the 3_3 zero matrix.

The system state noise input consists of IMU measurement noise and bias error noise, that is:

$$W=(n_g,n_a,r_g,r_a)^T \in \mathbb{R}^{12} \quad (23)$$

As a result, the Jacobian matrix $$\frac{d\dot{S}}{dW} \in \mathbb{R}^{15\times12}$$

w.r.t. the system noise is:

$$\frac{\partial \dot{S}}{\partial W} = \begin{pmatrix} 0_{3\times3} & 0_{3\times3} & 0_{3\times3} & 0_{3\times3} \\ -I_{3\times3} & 0_{3\times3} & 0_{3\times3} & 0_{3\times3} \\ -[v_b]_\times & -I_{3\times3} & 0_{3\times3} & 0_{3\times3} \\ 0_{3\times3} & 0_{3\times3} & I_{3\times3} & 0_{3\times3} \\ 0_{3\times3} & 0_{3\times3} & 0_{3\times3} & I_{3\times3} \end{pmatrix} \quad (24)$$

Based on the relationship between the continuous-time and discrete-time systems, the final Jacobians for state covariance propagation are:

$$J_S = \frac{\partial \hat{S}}{\partial S} dt + I_{15\times15}, \quad J_W = \frac{\partial \hat{S}}{\partial W} dt \quad (25)$$

Treatment of VO Relative State Measurement Using Delayed State Stochastic Cloning The state estimation system provided herein utilizes both absolute state measurements (GPS provides absolute position and velocity measurement in the NED coordinate system; the barometer provides absolute state measurement for altitude) and the relative six D.O.F pose measurement (between the two stereo frames) provided by long-range stereo VO. To deal-with both absolute and relative state measurements, the system state defined in Equation (19) is further augmented by stochastic cloning of a delayed pose $p_1$, $\delta\theta_1$ which is updated with the previous VO measurement, namely:

$$\tilde{S}=(S^T,p_l,\delta\theta_l)^T \in \mathbb{R}_{21} \quad (26)$$

During the system state propagation, the delayed pose $p_1$, $\delta\theta_1$ is kept as constant; that means $\dot{p}_l=0$ and $\dot{\delta\theta}_l=0$. Therefore, the Jacobians for the augmented state $\dot{S}$ are:

$$\tilde{J}_S = \begin{pmatrix} J_S & 0_{15\times6} \\ 0_{6\times15} & I_{6\times6} \end{pmatrix} \in \mathbb{R}^{21\times21} \quad (27)$$

$$\tilde{J}_W = \begin{pmatrix} J_W \\ 0_{6\times12} \end{pmatrix} \in \mathbb{R}^{21\times12} \quad (28)$$

The augmented state covariance is denoted as $\tilde{P}(k+1|k) \in \mathbb{R}^{21\times21}$. Accordingly, the covariance propagation for the state augmented system is given as:

$$\tilde{P}(k+1|k)=\tilde{J}_S\tilde{P}(k)\tilde{J}_S^T + \tilde{J}_W Q(K)\tilde{J}_W^T \quad (29)$$

For the system initialization, the initial system state covariance is of the form:

$$\tilde{P}(0) = \begin{pmatrix} \Sigma_p^2 & 0 & 0 & 0 & 0 & \Sigma_p^2 & 0 \\ 0 & \Sigma_\theta^2 & 0 & 0 & 0 & 0 & \Sigma_\theta^2 \\ 0 & 0 & \Sigma_{vb}^2 & 0 & 0 & 0 & 0 \\ 0 & 0 & 0 & \Sigma_{bg}^2 & 0 & 0 & 0 \\ 0 & 0 & 0 & 0 & \Sigma_{ba}^2 & 0 & 0 \\ \Sigma_p^2 & 0 & 0 & 0 & 0 & \Sigma_p^2 & 0 \\ 0 & \Sigma_\theta^2 & 0 & 0 & 0 & 0 & \Sigma_\theta^2 \end{pmatrix} \quad (30)$$

Long-range stereo VO generates the relative six DoF motion measurement between the two visual frames. The relative measurement model is defined as:

$$\Delta p = \exp(-[\delta\theta_l]_\times) R_l^T (p-p_l)$$

$$\Delta\theta = \log(\exp(-[\delta\theta_l]_\times) R_l^T \hat{R} \exp([\delta\theta]_\times)) \quad (31)$$

where $\Delta p \in \mathbb{R}^3$ is a position increment from the current pose p, $\hat{R}$ to the delay pose $p_l$, $R_l$ and $\Delta\theta \in \mathbb{R}^3$ is the rotation increment. $R_l \in SO(3)$ is the rotation matrix for previous visual updated orientation (i.e., the delayed state orientation), and $\delta\theta_l$ indicates the error rotation vector for the delayed state. $\hat{R} \in SO(3)$ is the rotation matrix for the current orientation, and $\delta\theta$ is the current error rotation vector. The matrix logarithm $\log(R_l^T \hat{R})$ maps the rotation matrix $R_l^T \hat{R}$ to a rotation vector. For Jacobians with a relative translation $\Delta p$ w.r.t. system state S:

$$\frac{\partial \Delta p}{\partial p} = \exp(-[\delta\theta_l]_\times)\Big|_{\delta\theta_l=0} R_l^T = R_l^T \quad (32)$$

$$\frac{\partial \Delta p}{\partial p_l} = -\exp(-[\delta\theta_l]_\times)\Big|_{\delta\theta_l=0} R_l^T = -R_l^T$$

$$\frac{\partial \Delta p}{\partial \delta\theta_l} = \frac{\partial \exp(-[\delta\theta_l]_\times)}{\partial \delta\theta_l}\Big|_{\delta\theta_l=0} R_l^T(p-p_l) = [R_l^T(p-p_l)]_\times$$

where the derivative $$\frac{\partial \Delta p}{\partial \delta\theta_l}$$

is derived based on the first-order Taylor expansion for the exponential map at $\delta\theta_l=0$. Additionally, the anti-commutativity rule for skew-symmetric matrix, namely: $[\delta\theta_l]_\times R_l^T(p-p_l) = -[R_l^T(p-p_l)]_\times \delta\theta_l$.

The Jacobians for the $\Delta\theta$ are computed as:

$$\frac{\partial \Delta\theta}{\partial \delta\theta} = \frac{\partial \log(R_l^T \hat{R} \exp([\delta\theta]_\times))}{\partial \delta\theta}\bigg|_{\delta\theta=0} = Adj(R_l^T \hat{R}) = R_l^T \hat{R} \quad (33)$$

$$\frac{\partial \Delta\theta}{\partial \delta\theta_l} = \frac{\partial \log(\exp(-[\delta\theta_l]_\times) R_l^T \hat{R})}{\partial \delta\theta_l}\bigg|_{\delta\theta_l=0} = -Adj(I_{3\times 3}) = -I_{3\times 3}$$

where Adj(R) is the adjoint map in R∈SO(3), and it has the property of Adj(R)=R. The derivative for the matrix logarithm is derived by the first-order approximation of Campbell-Baker-Hausdorff formula. As a result, the VO relative measurement Jacobian is expressed as:

$$H_{vo} = \begin{pmatrix} R_l^T & 0_{3\times 12} & -R_l^T & [R_l^T(p-p_l)]_\times \\ 0_{3\times 3} & R_l^T \hat{R} & 0_{3\times 12} & -I_{3\times 6} \end{pmatrix} \quad (34)$$

Denote the VO relative measurement as $(\Delta p_{vo}, \Delta\theta_{vo})^T$; the measurement residual is given by:

$$\tilde{r} = \begin{pmatrix} \Delta p_{vo} - \Delta p \\ \Delta\theta_{vo} \ominus \Delta\theta \end{pmatrix} \quad (35)$$

where the rotational vector residual $\Delta\theta_{vo} \ominus \Delta\theta$ is defined as $\log(\Delta R^{-1} \Delta R_{vo})$. $\Delta R = \exp([\Delta\theta]_\times)$ is the predicted rotation matrix from the current state to the delayed state. Additionally, the $\Delta R = \exp([\Delta\theta]_\times)$ is the VO easured one.

It is worthwhile to note that, after each VO relative measurement update, the delayed portion vector of the state $p_l$, $\delta\theta_l$ is set equal to the current updated pose p(k+1), $\delta\theta(k+1)$, and the state covariance matrix is updated by "cloning" the corresponding covariance blocks from the current state covariance to delayed pose covariance. To update the EKF state, the VO measurement should be transformed from the visual frame to the IMU body frame using the visual-IMU relative pose Calibration $T_{is}$; suppose the VO measurement in visual frame is $Z_s$; its corresponding measurement in the IMU body frame is:

$$Z_i = T_{is} Z_s T_{is}^{-1} \quad (36)$$

The update of the EKF state is standard, that is:

$$K = \tilde{P}(k+1|k) H^T (\tilde{P}(k+1|k) H^T + R)^{-1}$$

$$\tilde{S}(k+1) = \tilde{S}(k) + K\tilde{r} \quad (37)$$

The EKF covariance update uses Joseph's form to avoid the negative definition, that is:

$$\tilde{P}(k+1) = (I-KH)\tilde{P}(k+1|k)(I-KH)^T + KRK^T \quad (38)$$

Update of EKF State Using Absolute State Measurements

GPS provides absolute position and velocity measurement in the NED frame system; suppose the heading of the initial EKF navigation frame is aligned with the NED frame; the GPS measurement model is:

$$Z_{gps} = \begin{bmatrix} p + \hat{R}\exp([\delta\theta]_\times) t_{ig} \\ \hat{R}\exp([\delta\theta]_\times)(v_b + [\hat{\omega} - \delta b_g]_\times t_{ig}) \end{bmatrix} \quad (39)$$

where $t_{ig} \in \mathbb{R}^3$ is the translation from the GPS receiver to the IMU body frame, as explained in FIG. 10. The GPS measurement Jacobian is derived as:

$$H_{gps} = \begin{pmatrix} I_{3\times 3} & -\hat{R}[t_{ig}]_\times & 0_{3\times 3} & 0_{3\times 3} & 0_{3\times 3} \\ 0_{3\times 3} & -\hat{R}[v_b]_\times & \hat{R} & [t_{ig}]_\times & 0_{3\times 3} \end{pmatrix} \quad (40)$$

Since GPS measurement in altitude has a large uncertainty, the GPS height and velocity in altitude are not utilized to update the EKF state. Only the position and velocity for north and east are kept as GPS measurements, namely $Z_{gps} = (p_n, p_e, v_n, v_e)^T \in \mathbb{R}^4$. Consequently, the third and the sixth rows for the GPS Jacobian $H_{gps}$ are also removed.

The "GPS health status", which reports how many satellites can be seen by the receiver, are utilized to determine the current GPS measurement covariance. For bad "GPS health status", GPS will report a large covariance. It is worth mentioning that the $X^2$ test at 0.95 is utilized to verify the compatibility between current GPS measurement and the system predicted state. If GPS measurement "jumps" due to perturbation (e.g., multipath), the system will reject the GPS measurement automatically. In fact, the sensor measurements are firstly checked by the $X^2$ test before they are utilized for state estimation. As a result, the EKF state estimator is robust to any sensor failures.

The barometer provides absolute altitude measurements w.r.t. the navigation frame. The navigation frame is a local NED frame, so the barometer measures the negative altitude w.r.t. the NED coordinate. As a result, the barometer measurement model is:

$$Z_{baro} = -p_d \quad (41)$$

where $p_d$ denotes the z component for current position. Its Jacobian is:

$$H_{baro} = (0 \ 0 \ -1 \ 0_{1\times 18}) \quad (42)$$

Figure 11:
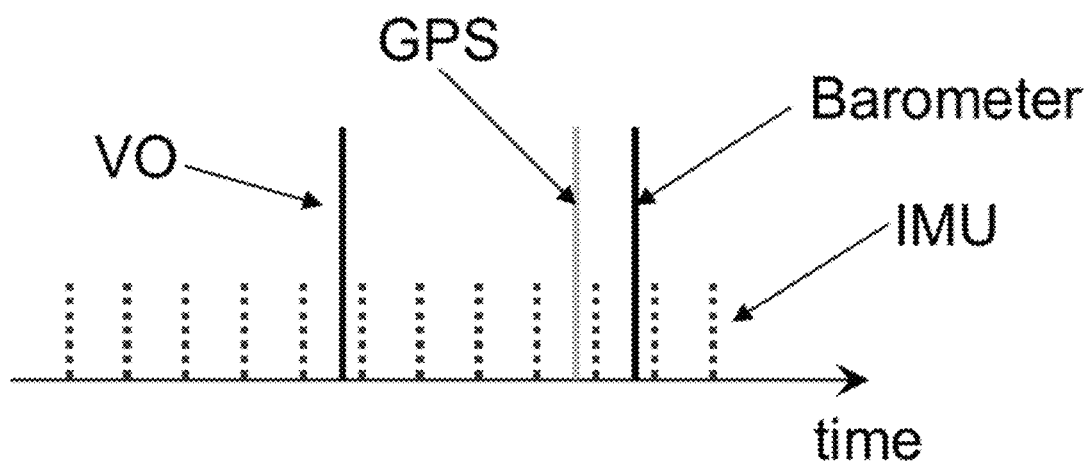
FIG. 11 shows a ring buffer utilized to keep two seconds of incoming sensor information.

For the EKF implementation, a ring buffer with a 2-s time is kept to save all of the incoming sensor data. As shown in FIG. 11, when a new VO measurement arrives, its time stamp is usually not the most up to date due to the image transmission and the stereo VO calculation delay. For this case, after the update of the EKF state on the VO time stamp, the subsequent IMU integral should be re-integrated to re-predict the current state. The same processing is also carried out for GPS and barometric measurements. To further decrease the computational cost of IMU re-integration, the IMU pre-integral technique in the IMU body frame can be utilized.

The foregoing descriptions of embodiments of the invention have been presented for purposes of illustration and description only. They are not intended to be exhaustive or to limit the invention to the forms disclosed. Accordingly, many modifications and variations will be apparent to the practitioner skilled in the art. The scope of the invention as defined by the appended claims not the preceding disclosure.

We claim:

1. A system for estimating the state of an aerial vehicle comprising:
    one or more relative sensors, including at least an inertial measurement unit and a visual odometry unit;
    one or more absolute sensors; and
    a processor, running software for performing the functions of:

keeping a current state and current state covariance, the current state including at least a current position, a current orientation, a current velocity, a delayed position and a delayed orientation, the delayed position and delayed orientation being based on visual odometry from a previous current state;

predicting an update of the current state and an update of the current state covariance based on an integration of a reading from the inertial measurement unit;

receiving visual odometry, updating the delayed position and orientation with the current position and orientation, updating the current position and orientation with the visual odometry;

receiving state information from an absolute sensor, updating the current state with the state information and covariance from the absolute sensor;

recalculating the covariance of the current state to give readings from the relative and absolute sensors a weight in the estimated state of the vehicle; and repeating the functions performed by the software.

2. The system of claim 1 wherein updating the current state and covariance is performed by an extended Kalman filter.

3. The system of claim 2 wherein the current state includes covariances of each element included in the current state.

4. The system of claim 3 wherein the one or more absolute sensors are selected from a group consisting of a global positioning system and a barometer.

5. The system of claim 3 wherein the software performs the further functions of:

calculating an uncertainty factor between the covariance of the current position and orientation and the covariance of the delayed position and orientation; and adjusting the visual odometry covariance based on the uncertainty factor.

6. The system of claim 3 wherein the function of receiving visual odometry includes:

updating the covariance of the visual odometry;

verifying that the covariance of the visual odometry is lower than the covariance of the predicted updated state; and verifying that the covariance of the visual odometry is greater than a previous error covariance.

7. The system of claim 3 wherein the function of receiving state information from an absolute sensor includes:

verifying that the updated covariance of the position, orientation, delayed position and the delayed orientation have decreased with respect to their respective covariances prior to the receiving of state information from the absolute sensor; and verifying that the covariances of the current position and current orientation are higher than the covariances for the delayed position and delayed orientation.

8. The system of claim 1 further comprising:

for the visual odometry unit, determining, based on the current stereo baseline-depth ratio, that short range stereo mode is no longer viable;

switching the visual odometry unit to monocular mode;

maintaining a local map consisting of 3D sparse map points generated by sparsely selected key-frames, the selected key-frames providing sufficient relative motion between the frames for long-range triangulation;

identifying new features visible in multiple selected key-frames and performing triangulation using a dynamic pseudo baseline formed by the relative pose of the features between neighboring key-frames.

9. The system of claim 8 further comprising:

for new features that cannot be triangulated, inserting those features into a candidate queue; and iteratively refining the feature depth in the subsequent key-frames by tracking stereo information with a multi-view inverse depth filter wherein the feature will be added to the map and used for camera pose tracking if the inverse depth variance is smaller than a given threshold.

10. The system of claim 9 wherein, for each subsequent key-frame, the inverse depth observation distribution for the feature is calculated from the tracking frame static stereo matching or obtained by the dynamic pseudo baseline formed by the motion between the current tracking frame and a reference key-frame.

11. The system of claim 8 wherein the integrated readings from the inertial measurement unit are used by the visual odometry unit for pose tracking between the selected key-frames.

12. A method for estimating the state of an aerial vehicle comprising:

keeping a current state and current state covariance, the current state including at least a current position, a current orientation, a current velocity, a delayed position and a delayed orientation, the delayed position and delayed orientation being based on visual odometry from a previous current state;

predicting an update of the current state and an update of the current state covariance based on an integration of a reading from an inertial measurement unit;

receiving visual odometry from a visual odometry unit, updating the delayed position and orientation with the current position and orientation, updating the current position and orientation with the visual odometry and recalculating the covariance of the current state;

receiving state information from an absolute sensor, updating the current state and with the state information and covariance from the absolute sensor and recalculating the covariance of the current state; and repeating the functions performed by the software.

13. The system of claim 12 wherein updating the current state and covariance is performed by an extended Kalman filter.

14. The system of claim 13 wherein the current state includes covariances of each element included in the current state.

15. The system of claim 13 wherein the one or more absolute sensors are selected from a group consisting of a global positioning system and a barometer.

16. The system of claim 13 wherein the software performs the further functions of:

calculating an uncertainty factor between the covariance of the current position and orientation and the covariance of the delayed position and orientation; and adjusting the visual odometry covariance based on the uncertainty factor.

17. The system of claim 13 wherein the function of receiving visual odometry includes:

updating the covariance of the visual odometry;

verifying that the covariance of the visual odometry is lower than the covariance of the predicted updated state; and verifying that the covariance of the visual odometry is greater than a previous error covariance.

18. The system of claim 13 wherein the function of receiving state information from an absolute sensor includes:
- verifying that the updated covariance of the position, orientation, delayed position and the delayed orientation have decreased with respect to their respective covariances prior to the receiving of state information from the absolute sensor; and
- verifying that the covariances of the current position and current orientation are higher than the covariances for the delayed position and delayed orientation.

\* \* \* \* \*